Nov. 18, 1969  R. P. FARRELL, JR  3,478,596
WASTEWATER SAMPLING APPARATUS
Filed Sept. 11, 1967
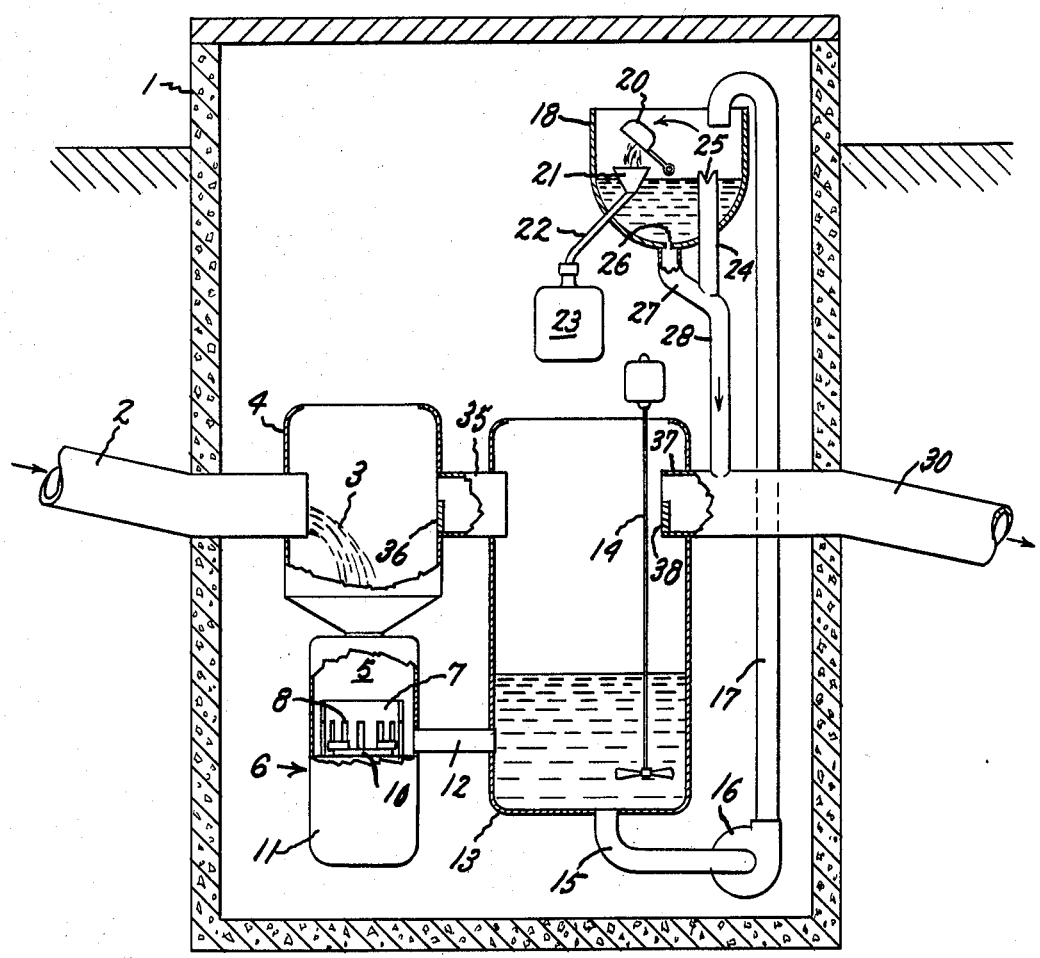
Inventor:
Robert P. Farrell Jr.,
by John M. Davis
His Attorney.

United States Patent Office

3,478,596
Patented Nov. 18, 1969

3,478,596
WASTEWATER SAMPLING APPARATUS
Robert P. Farrell, Jr., Schenectady, N.Y., assignor to General Electric Company, a corporation of New York
Filed Sept. 11, 1967, Ser. No. 666,735
Int. Cl. G01n 1/10
U.S. Cl. 73—421        6 Claims

ABSTRACT OF THE DISCLOSURE

This apparatus includes a grinder unit and a pump to deliver raw wastewater from the grinder into a sampling chamber. A sampler device which is operated automatically when the pump is running takes small samples of the wastewater flowing through the sampling chamber at fixed intervals and delivers them into a reservoir which may be refrigerated for subsequent analysis.

BACKGROUND OF THE INVENTION

The treatment of wastewater, i.e. raw sewage, to recover potable water and to prevent the polution of streams and other bodies of water has become a matter of national importance. In particular, the problem of sewage treatment is no longer a problem confined to large urban population centers, but because of the expansion of suburban and semirural population centers, a problem has arisen with the design of smaller units, so-called "package units," for the treatment of relatively smaller volumes of sewage. Design criteria suitable for equipment for treating the sewage generated by a population of a half million, for example, is not suitable for a population of a few hundred. Also specialized equipment for a suburban industrial plant or a shopping center present different requirements than an era composed primarily of residences. For health reasons, it is important that a sewage treatment installation be of an adequate capacity, and for economic reasons, it is equally important that it not have a capacity grossly in excess of the demands of the particular area it serves. Many of the engineering design criteria for such equipment are based upon observations made of the treatment equipment for large urban population centers and include factors of public behavior which may have been perfectly valid thirty years ago, but no longer reflect, for example, such changes as the fact that Monday is no longer the almost universally accepted day upon which the family's wishing is done. The advent of the automatic washing machine and clothes dryer have apparently been responsible for that change. Furthermore, climate and other factors such as local cooking habits introduce variables which have a far greater effect upon the sewage output of small groups than upon the output of larger populations. It is therefore apparent that some means of determining more accurately the necessary capacity of a proposed small sewer district is needed.

SUMMARY OF THE INVENTION

Briefly stated, an apparatus is provided comprising in combination means for periodically receiving relatively small amouns of raw sewage until a predetermined amount has been collected, grinding the solids to a uniform maximum size, agitating the resulting mixture to produce a substantially uniform suspension, delivering the suspension to and through a sampling chamber where uniform samples are withdrawn from the suspension in an incremental fashion based upon the volume of the suspension. These samples are collected and stored under refrigeration for subsequent analysis. It is therefore a principal object of the invention to provide such a sampling apparatus which may be operated in an essentially automatic fashion and which provides means for processing raw sewage whereby samples may be withdrawn therefrom which are more accurately representative of the composition of said sewage than by previously available means.

BRIEF DESCRIPTION OF THE DRAWING

The invention will better understood from the following detailed description taken in conjunction with the accompanying drawing in which the apparatus is schematically shown in vertical section.

DESCRIPTION OF THE PREFERRED EMBODIMENTS

One manner in which use of the invention is contemplated is as a monitoring apparatus to be temporarily interposed between a building and an existing disposal means such as, for example, a septic tank installation. Such an installation is schematically illustrated in the drawing, wherein a pre-cast concrete container 1 is positioned in the ground as shown. The soil pipe 2 from the building, which is not shown, delivers the raw wastewater 3 into a receptacle 4 which is in communication with the reception chamber 5 of a commercially available garbage grinding mechanism 6 such as, for example, a General Electric Co. Model 5S20A "Disposal" (a registered trademark) food waste disposer. In this particular unit, a cuplike member 7 having a plurality of slots 8 in the side wall acts as a static filter or strainer and retains solids therein which are too large to pass through the openings. As is conventional, a grinding head 10 is provided which is connected to an electric motor 11.

The chamber 5 is provided with a conduit 12 in communication with a wet well 13. An electrically driven stirrer 14 is provided in wet well 13, and a drain cosduit 15 is connected to the input of an electrically driven pump 16, the output of which is connected by a conduit 17 leading to a sampling chamber 18. An electrically driven, rotatable sampling cup or dipper 20 is mounted within the chamber 18 and is adapted to be rotated in the direction shown by the arrow whereupon a sample of a liquid suspension contained in said chamber is delivered to a receiver 21 for each rotation of the sample cup 20. Such samples are delivered by means of conduit 22 to a sample collection container 23 which may be refrigerated to prevent degradation of the collected material until it is removed for analysis.

The liquid level in chamber 18 is regulated by means of a primary drain conduit 24 which is provided at its upper end with a V-notch weir 25, as shown. A secondary drain orifice 26 is provided in the lowest portion of chamber 18 and is in communication with a conduit 27. Primary drain conduit 24 and conduit 27 are in communication with conduit 28 which provides drainage into soil pipe 30 which leads to a septic tank or other receptacle, not shown. It should be noted that the purpose of orifice 26 is to permit the chamber 18 to drain completely between pumping operations so that the wastewater delivered by each pumping cycle will not be contaminated by that delivered by previous pumping cycles.

By-pass means are provided to prevent flooding in the event of a malfunction of the pumping apparatus or in the event the in-flux of sewage exceeds the pumping capacity for one reason or another. To this end, a conduit 35 provided with a weir 36 affords communication between receptacle 4 and wet well 13, as shown. A conduit 37 provided with a weir 38 affords communication between the interior of wet well 13 and soil pipe 30 as shown. The manner in which this by-pass functions is believed to be self-explanatory to those skilled in the art, so no further discussion is believed to be warranted.

In a preferred mode of operation, raw sewage 3 enters receptacle 4 and passes into the reception chamber 5 of the grinder 6 the slots 8 of which act as a static filter and permit the liquid portions of the sewage and the smaller particles to pass through conduit 12 and into the wet well 13. When the liquid level in the wet well reaches a predetermined point, the grinder 6 and the stirrer 14 are turned on and the larger particle solids in the grinder are shredded and introuced into the wet well where the stirrer holds all the particles in suspension. After a short delay of a few seconds to insure mixing, pump 16 is energized to introduce the suspension into the sample chamber 18, the velocity head of the flowing stream being used to insure thorough mixing in the chamber. The dipper 20 is activated to slowly rotate through the liquid and periodically collects a small representative sample of the waste water which is deposited into receiver 21 and through conduit 22 collected in container 23, while a substantially constant level is maintained by weir 25. The sample dipper is rotated at a rate which bears a known relationshp to the pumping rate. For example, one sample may be taken for each thirty seconds of pump running time. Knowing the output of the pump, a true flow-proportional composite sample is obtained.

It will also be noted that information relating to the flow characteristics of the particular installation being monitored are readily obtainable by employing a constant displacement pump 16. It will be appreciated that by recording the pump running time on, for example, a conventional strip chart event recorder, the total flow through the system may be readily obtained by multiplying the total time the pump was in operation by its known pumping rate. Such a record will also provide the peak flow rates in terms of time of day, factors which are important in plant design.

The sample collected in container 23 is customarily analyzed for such factors as pH, suspended solids, suspended volatile solids, total solids, total volatile solids, ammonia nitrogen, total nitrogen, orthophosphate, total phosphate, chemical oxygen demand, biochemical oxygen demand, hardness and grease by standard methods.

It will be obvious to those skilled in the art to provide conventional switch controls for activating and deactivating the several electric motors involved, and since the initial switch control is that which senses the preset liquid level in the wet well, the cycle is initiated by the gravity discharge of a predetermined quantity of raw sewage. It will be equally obvious that the various steps of the previously described operation or any one of them may be manually controlled if desired, and that the capacities of the various components may be varied as found necessary for the particular installation to be monitored. It is therefore not intended to limit the invention to the preferred embodiments above shown since many variations of the present teachings can be made without departing from the true spirit and scope of the invention.

What is claimed as new and securable by Letters Patent of the United States is:

1. Apparatus for sampling raw wastewater including in combination, means to receive wastewater containing solids, means for delivering said solids and wastewater to a grinding means including a retaining means for holding the larger sizes of solids in said grinding means, means for collecting a predetermined amount of the wastewater and solids passed by said retaining means including means for producing a suspension of said solids in said wastewater, means for subtantially simultaneously activating said griniding means to grind the solids retained by said screening means and delivering the ground solids to said collecting means, and for activating said means for producing said suspension when said predetermined amount of wastewater and solids have been collected, means for delivering said suspension from said collecting means to and through a sampling means, and means for withdrawing and combining a plurality of samples of said suspension at spaced intervals of time as said suspensions passes through said sampling means to provide a flow-proportional composite sample.

2. The apparatus set forth in claim 1 wherein said retaining means comprises a static screen.

3. The apparatus set forth in claim 1 wherein said means for producing a suspension comprises a stirrer.

4. The apparatus set forth in claim 1 wherein said means for delivering said suspension to said sampling means comprises a pump and conduit means.

5. The apparatus set forth in claim 1 wherein said means for withdrawing said samples comprises a rotatable dipper.

6. The apparatus set forth in claim 1 wherein inlet and outlet means are provided whereby said wastewater is introduced into said means to receive and whereby said wastewater is afforded egress from said apparatus after said samples are removed therefrom, and means comprising a by-pass interconnecting said inlet and outlet means.

References Cited

UNITED STATES PATENTS

| | | | |
|---|---|---|---|
| 1,020,251 | 3/1912 | Behr et al. | 73—421 |
| 2,348,806 | 5/1944 | Gillard | 73—421 |
| 2,872,818 | 2/1959 | Johnson | 73—421 |

H. CLEMENT SWISHER, Primary Examiner

PO-1050
(5/69)

UNITED STATES PATENT OFFICE
CERTIFICATE OF CORRECTION

Patent No. __3,478,596__          Dated __November 18, 1969__

Inventor(s) __Robert P. Farrell, Jr.__

It is certified that error appears in the above-identified patent and that said Letters Patent are hereby corrected as shown below:

In the specification, Column 1, line 37, change "era" to - area -. Column 1, line 49, change "wishing" to - washing -. Column 2, line 27,
Same line, change "Disposal" to - Disposall -. Column 2, line 36, change "cosduit" to - conduit -. Column 3, line 9, change "introuced" to - introduced -.

SIGNED AND
SEALED
OCT 20 1970

(SEAL)
Attest:

Edward M. Fletcher, Jr.
Attesting Officer

WILLIAM E. SCHUYLER, JR.
Commissioner of Patents